(12) United States Patent
Mazumder et al.

(10) Patent No.: US 9,279,365 B2
(45) Date of Patent: Mar. 8, 2016

(54) POWER AUGMENTATION SYSTEMS AND METHODS FOR GRID FREQUENCY CONTROL

(75) Inventors: Indrajit Mazumder, Karnataka (IN); Rajarshi Saha, Karnataka (IN)

(73) Assignee: General Electric Company, Schenectady, NY (US)

( * ) Notice: Subject to any disclaimer, the term of this patent is extended or adjusted under 35 U.S.C. 154(b) by 590 days.

(21) Appl. No.: 13/602,583

(22) Filed: Sep. 4, 2012

(65) Prior Publication Data

US 2014/0060067 A1 Mar. 6, 2014

(51) Int. Cl.
*F02C 3/30* (2006.01)
*F02C 7/143* (2006.01)
*F01K 23/10* (2006.01)
*F02C 6/18* (2006.01)

(52) U.S. Cl.
CPC . *F02C 3/30* (2013.01); *F01K 23/10* (2013.01); *F02C 6/18* (2013.01); *F02C 7/1435* (2013.01); *F05D 2270/061* (2013.01); *Y02E 20/16* (2013.01)

(58) Field of Classification Search
CPC ............ F02C 3/30; F02C 6/18; F02C 7/1435; F02C 7/224; F01K 23/10
USPC ............ 60/39.26, 39.3, 39.182, 39.53, 39.55, 60/775
See application file for complete search history.

(56) References Cited

U.S. PATENT DOCUMENTS

| | | | |
|---|---|---|---|
| 6,012,279 A | 1/2000 | Hines | |
| 6,474,069 B1 | 11/2002 | Smith | |
| 6,499,302 B1 * | 12/2002 | Ranasinghe | 60/772 |
| 6,499,303 B1 | 12/2002 | Polukort et al. | |
| 6,526,758 B2 | 3/2003 | Ranasinghe et al. | |
| 6,766,646 B1 | 7/2004 | Ford et al. | |
| 6,938,425 B2 | 9/2005 | Simpson et al. | |
| 7,146,795 B2 | 12/2006 | Pelini | |
| 7,428,818 B2 | 9/2008 | Hjerpe | |
| 7,668,623 B2 | 2/2010 | Kephart et al. | |
| 7,703,272 B2 | 4/2010 | Wagner et al. | |
| 7,712,301 B1 | 5/2010 | Wagner | |
| 2004/0065089 A1 * | 4/2004 | Liebig | 60/772 |
| 2005/0081529 A1 | 4/2005 | Bolis et al. | |
| 2007/0022734 A1 * | 2/2007 | Utamura | 60/39.53 |
| 2007/0270511 A1 * | 11/2007 | Melnichuk et al. | 518/700 |
| 2008/0250769 A1 * | 10/2008 | Wagner et al. | 60/39.24 |
| 2009/0038313 A1 * | 2/2009 | Ball et al. | 60/775 |

(Continued)

FOREIGN PATENT DOCUMENTS

EP 1001149 A2 5/2000

OTHER PUBLICATIONS

U.S. Appl. No. 13/195,895, filed Aug. 2, 2011, Merchant, et a.
U.S. Appl. No. 13/069,456, filed Mar. 23, 2011, Pemmi, et al.

*Primary Examiner* — William H Rodriguez
*Assistant Examiner* — Scott Walthour
(74) *Attorney, Agent, or Firm* — Sutherland Asbill & Brennan LLP

(57) ABSTRACT

The present application provides a combined cycle system. The combined cycle system may include a compressor water wash system in communication with a compressor and a water wash flow, a combustor water injection system in communication with a combustor and an injection flow, and a transient power augmentation system in communication with the compressor, the combustor, and a flow of supplemental water.

7 Claims, 3 Drawing Sheets

(56) References Cited

U.S. PATENT DOCUMENTS

| | | |
|---|---|---|
| 2009/0044513 A1 | 2/2009 | Fuller et al. |
| 2009/0249794 A1 | 10/2009 | Wilkes et al. |
| 2009/0272513 A1 * | 11/2009 | Russell et al. ........... 165/104.32 |
| 2010/0032964 A1 | 2/2010 | Hoffmann et al. |
| 2010/0242489 A1 | 9/2010 | Saha et al. |
| 2011/0018265 A1 | 1/2011 | Hoffmann et al. |

* cited by examiner

POWER AUGMENTATION SYSTEMS AND METHODS FOR GRID FREQUENCY CONTROL

TECHNICAL FIELD

The present application and the resultant patent relate generally to gas turbine engines and more particularly relate to gas turbine power augmentation systems and methods for rapid grid frequency response and control during transient events and the like.

BACKGROUND OF THE INVENTION

During power plant operation, a situation may arise in which it is desirable to increase quickly the overall power output for a relatively brief period of time. For example, the grid frequency may drop below a local target frequency of approximately 50 Hz or 60 Hz when power use demands exceed the power supply into the grid in a grid frequency excursion. For a turbine based power plant, the power capability of a turbine typically decreases as the grid frequency decreases. Most grid codes, however, require rapid increases in power output at low frequencies in a very quick response time. Given that steam turbine output cannot change or respond quickly during a grid frequency excursion due to thermal inertia, the entire output response must come from the gas turbine engine.

Conventional techniques for increasing the output of a gas turbine engine include increasing compressor mass flow via an online water wash, increasing the flow of fuel to the combustor for over-firing, and opening inlet guide vanes to the compressor (during part load operation). An increase in the compressor mass flow may be limited by operational constraints such as a compressor surge margin. Over-firing methods may provide a fast response but operating the turbine beyond normal combustion temperatures may lead to the degradation of hot gas path parts and an increase in maintenance costs. Further, the airflow to the compressor can only be increased if the gas turbine is operating at less than base load.

There is thus a desire for improved gas turbine power augmentation systems and methods to accommodate transient grid frequency excursions. Preferably such improved systems and methods may accommodate such transient events within existing grid code requirements without compromising component lifetime and maintenance requirements.

SUMMARY OF THE INVENTION

The present application and the resultant patent thus provide a combined cycle system. The combined cycle system may include a compressor water wash system in communication with a compressor and a water wash flow, a combustor water injection system in communication with a combustor and an injection flow, and a transient power augmentation system in communication with the compressor, the combustor, and a flow of supplemental water.

The present application and the resultant patent further provide a method of augmenting gas turbine power output. The method may include the steps of providing a water wash flow to a compressor, providing an injection flow to a combustor, and providing a supplemental water flow from a heat recovery steam generator to augment the water wash flow and/or the injection flow.

The present application and the resultant patent further provide a combined cycle system. The combined cycle system may include a compressor, a compressor water wash system in communication with the compressor, a combustor, a combustor water injection system in communication with the combustor, a heat recovery steam generator, and a transient power augmentation system in communication with the compressor, the combustor, and the heat recovery steam generator.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
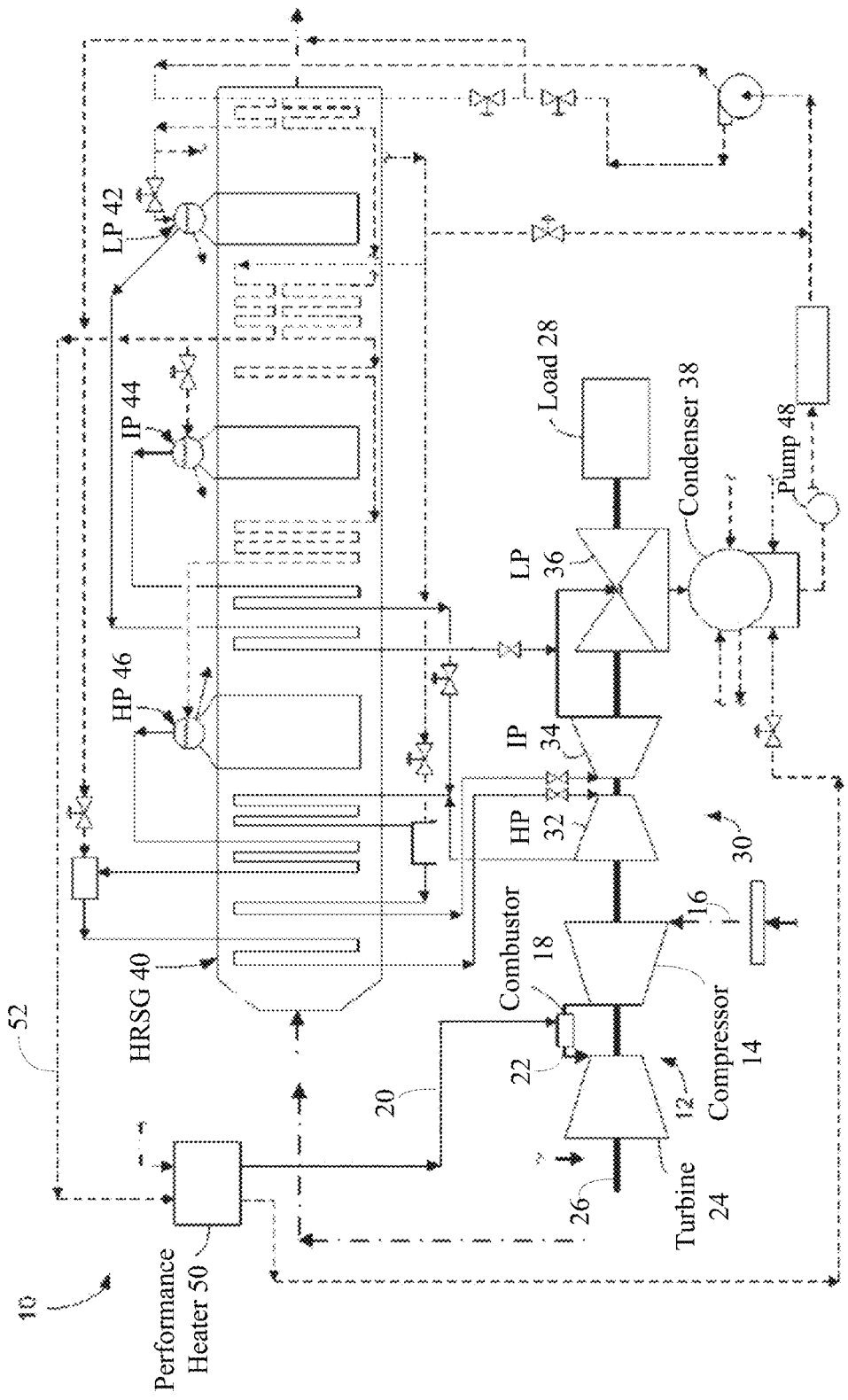
FIG. 1 is a schematic diagram of a combined cycle system with a gas turbine engine, a steam turbine, and a heat recovery steam generator.

Referring now to the drawings, in which like numerals refer to like elements throughout the several views, FIG. 1 shows a schematic diagram of a combined cycle system 10. The combined cycle system 10 may include a gas turbine engine 12. The gas turbine engine 12 may include a compressor 14. The compressor 14 compresses an incoming flow of air 16. The compressor 14 delivers the compressed flow of air 16 to a combustor 18. The combustor 18 mixes the compressed flow of air 16 with a pressurized flow of fuel 20 and ignites the mixture to create a flow of combustion gases 22. Although only a single combustor 18 is shown, the gas turbine engine 12 may include any number of combustors 18. The flow of combustion gases 22 is in turn delivered to a turbine 24. The flow of combustion gases 22 drives the turbine 24 so as to produce mechanical work. The mechanical work produced in the turbine 24 drives the compressor 14 via a shaft 26 and an external load 28 such as an electrical generator and the like. The gas turbine engine 12 may use natural gas, liquid fuels, various types of syngas, and other types of fuels. The gas turbine engine 12 may have different configurations and may use other types of components.

The combined cycle system 10 also includes a steam turbine 30. The steam turbine 30 may include a high pressure section 32, an intermediate pressure section 34, and one or more low pressure sections 36 with multiple steam admission points at different pressures. The low pressure section 36 may exhaust into a condenser 38. One or more shafts 26 may be used herein. Other configurations and other components also may be used herein.

The combined cycle system 10 also may include a heat recovery steam generator 40. The heat recovery steam generator 40 may include a low pressure section 42, an intermediate pressure section 44, and a high pressure section 46. Each section 42, 44, 46 generally includes one or more economizers, evaporators, and superheaters. Condensate from the condenser 38 may be fed to the heat recovery steam generator 40 via a condensate pump 48. The condensate passes through the sections 42, 44, 46 of the heat recovery steam generator 40 and exchanges heat with the flow of combustion gases 22 from the gas turbine engine 12. The steam produced in the heat recovery steam generator 40 may be used to drive the steam turbine 30. Likewise, hot, high pressure water produced in the heat recovery steam generator 40 may be used in a performance heater 50 to heat the incoming flow of fuel 20 to the combustor 18. The water used in the performance heater 50 generally is dumped to the condenser 38 after use. Other components and other configurations may be used herein.

Figure 2:
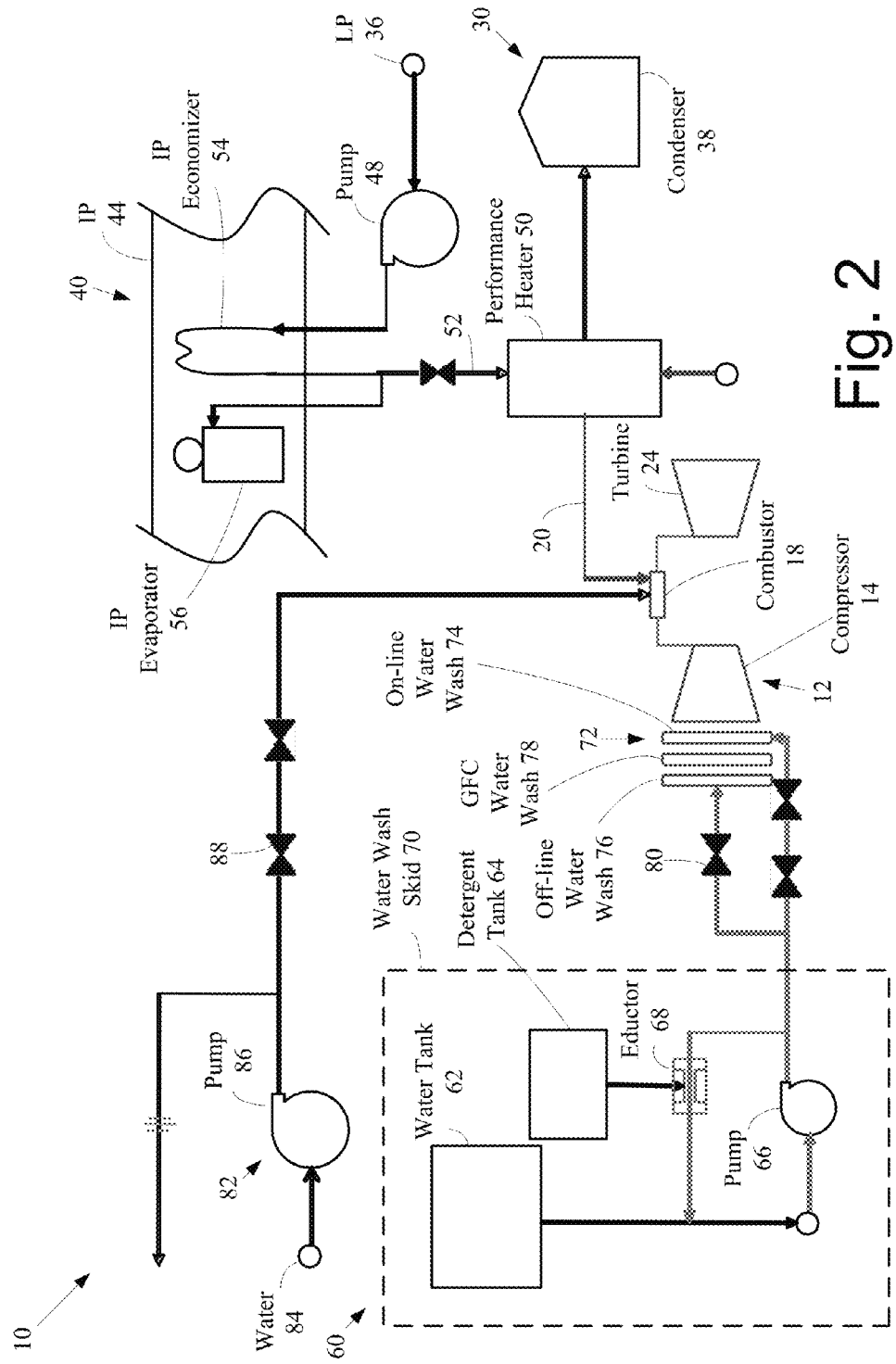
FIG. 2 is a schematic diagram of the combined cycle system of FIG. 1 showing portions of the gas turbine engine, the steam turbine, the heat recovery steam generator, a water injection system, and a water wash system.

FIG. 2 shows portions of the combined cycle system 10 in greater detail. Specifically, a flow of heating water 52 for use in the performance heater 50 may be taken from the intermediate pressure section 44 of the heat recovery steam generator 40 downstream of an intermediate pressure economizer 54 and before an intermediate pressure evaporator 56. The flow of heating water 52 may pass through the performance heater 50 where the heating water 52 exchanges heat with the flow of fuel 20 before the flow of fuel 20 enters the combustor 18. The heating water 52 may be under high pressure. As described above, the heating water 52 then may be dumped in the condenser 38 without further use.

The combined cycle system 10 also may use a compressor water wash system 60 positioned about the compressor 14 of the gas turbine engine 12. Generally described, the compressor water wash system 60 may include a water tank 62 with a supply of demineralized water therein, a detergent tank 64 with a detergent therein, and a water wash pump 66. An eductor 68 or other type of supply mechanism may be used to supply the detergent from the detergent tank 64 in an offline mode. The water tank 62, the detergent tank 64, the water wash pump 66, the eductor 68, and other components may be positioned on a water wash skid 70 or otherwise.

The compressor water wash system 60 also may include a number of spray systems 72. The spray systems 72 may be positioned about an inlet of the compressor 14. The spray system 72 may include an online water wash system 74, an offline water wash system 76, and a grid frequency control online water wash system 78. The compressor wash system 60 also may include a number of valves 80. The valves 80 may be used to vary the pressure of the wash spray and the like. The compressor water wash system 60 thus may operate in online or offline mode with the water wash pump 66 and the valves 80 providing water to the compressor 14 at differing pressures and speeds. For example, the online water wash may be engaged for about 15 to about 30 minutes per day depending upon local conditions and other parameters. An offline water wash may be done periodically or during an outage. Many different parameters and operating procedures may be used herein. Other components and other configurations also may be used herein.

The combined cycle system 10 also may include a water injection system 82 in communication with the combustor 18. The water injection system 82 may include a demineralized water supply 84, a high pressure water injection pump 86, and a number of valves 88. In certain types of dual fuel combustors 18, water may be supplied during liquid fuel operations above about a thirty percent (30%) load so as to maintain overall emission in compliance with applicable regulations. Many different parameters and operating procedures may be used herein. Other components and other configurations also may be used herein.

Figure 3:
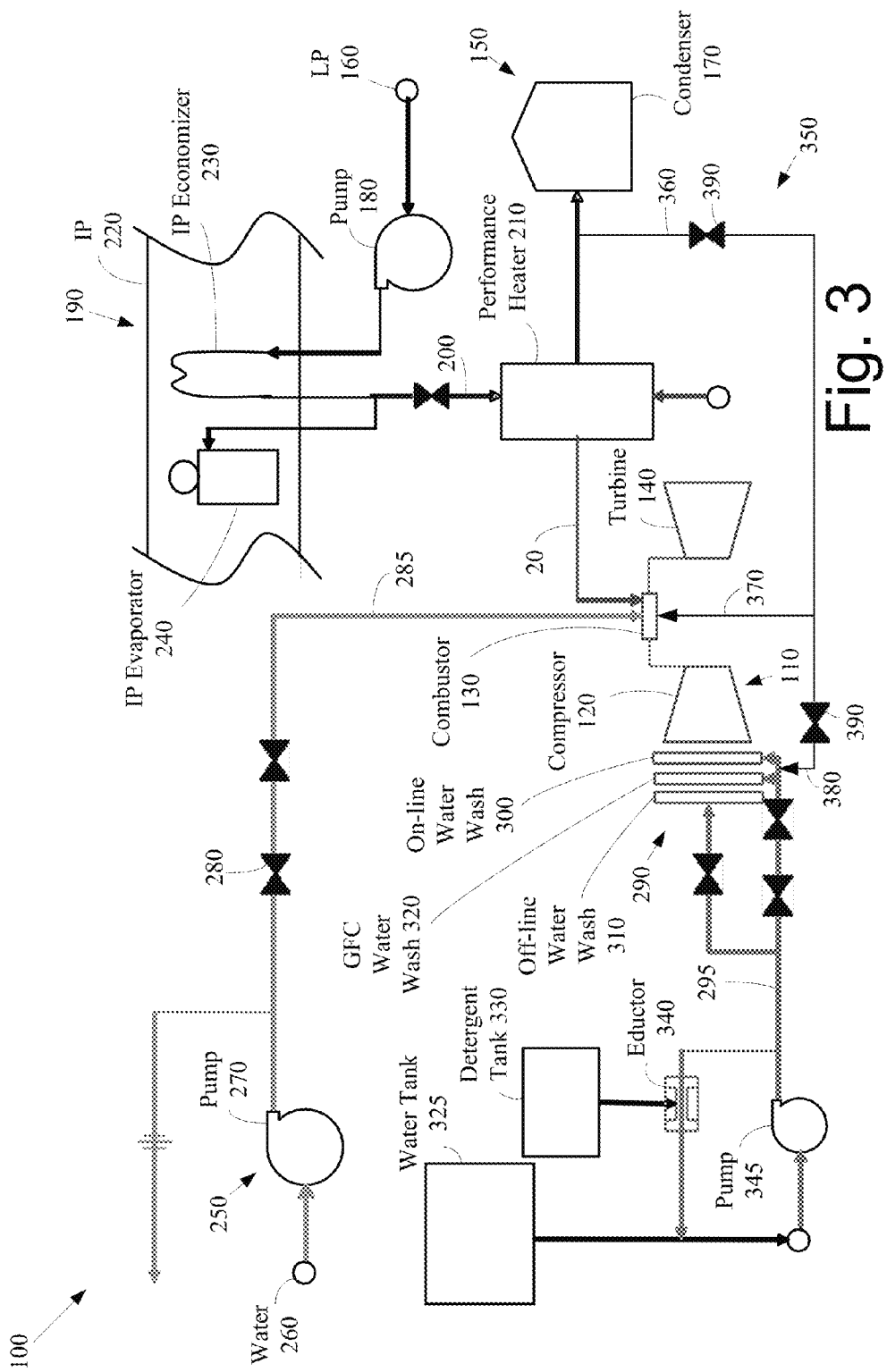
FIG. 3 is a schematic diagram of a combine cycle system as may be described herein showing portions of a gas turbine, a steam turbine, a heat recovery steam generator, a water injection system, a water wash system, and a power augmentation system.

FIG. 3 is a schematic diagram of an example of a combined cycle system 100 as may be described herein. The combined cycle system 100 may include a gas turbine engine 110 similar to that described above. The gas turbine engine 110 may include a compressor 120, a combustor 130, and a turbine 140. Other components and other configurations may be used herein. The combined cycle system 100 also may include a steam turbine 150 similar to that described above. The steam turbine 150 may include a low pressure section 160, a condenser 170, a pump 180, and other components as described above.

Likewise, the combined cycle system 100 may include a heat recovery steam generator 190 similar to that described above. The heat recovery steam generator 190 may divert a flow of supplemental water 200 to a performance heater 210 so as to heat the flow of fuel 20. The flow of supplemental water 200 may be taken from an intermediate pressure section 220 of the heat recovery steam generator 190 downstream of an intermediate pressure economizer 230 and before an intermediate pressure evaporator 240. Other sources of supplemental water 200 also may be used. Other components and other configurations also may be used herein.

The combined cycle system 100 also may include a water injection system 250 in communication with the combustor 130. Similar to that described above, the water injection system 250 may include a demineralized water supply 260, a high pressure water injection pump 270, and a number of valves 280. The water injection system 250 thus provides an injection flow 285 of demineralized water to the combustor 130 from the water supply 260 or elsewhere. Other components and other configurations may be used herein.

The combined cycle system 100 also may include a compressor water wash system 290 similar to that described above. The compressor water wash system 290 may provide a water wash flow 295 to an online water wash system 300, an offline water wash system 310, and/or a grid frequency control online water wash system 320. The compressor water wash system 290 may be in communication with a water tank 325 and/or other sources of water. The compressor water wash system 290 also may include a detergent tank 330 with a detergent flow therein, an eductor 340 or other type of supply mechanism, and a water wash pump 345. The compressor water wash systems 300, 310, 320 may be positioned about an inlet of the compressor 120 so as to provide the water wash flow 295 therein. Other components and other configurations also may be used herein.

The combined cycle system 100 also may include a transient power augmentation system 350. The transient power augmentation system 350 may include a tap off line 360. The tap off line 360 may be in communication with the flow of supplemental water 200 from the heat recovery steam generator 190 or elsewhere. The tap off line 360 may capture the flow of supplemental water 200 downstream of the performance heater 210 and before the condenser 170 of the steam turbine 150. Other sources of the supplemental water 200 may be used herein. The tap off line 360 may lead to a combustor line 370 in communication with the combustor 130 and a grid frequency control water wash manifold line 380 in communication with the grid frequency control online water wash system 320. The flow of supplemental water 200 thus may provide both additional mass flow into the compressor 120 and additional cooling to the combustor 130 in a fast and efficient manner. One or more pressure reducing valves and/or on/off valves 390 also may be used herein. A larger manifold and associated nozzles may be required herein as compared to conventional components. Other components and other configurations may be used herein.

In use, the combined cycle system 100 thus may use the transient power augmentation system 350 to provide additional power during transient events. Specifically, the transient power augmentation system 350 provides a faster response overall power response to a frequency grid event. In addition to conventional online water wash and over-fire techniques that may be available during such a grid event, the transient power augmentation system 350 provides the flow of supplemental water 200 from the intermediate pressure section 220 of the heat recovery steam generator 190 or elsewhere to the combustor 130 via the combustor line 370 and to the compressor 120 via the grid frequency control water wash manifold line 380. The transient power augmentation system 350 thus should result in fewer or no de-rate requirements at hot ambient conditions at lower frequencies. Moreover, maintenance requirements may be reduced due to lower fire over rates to meet grid requirements.

The transient power augmentation system 350 thus may be a source of additional power apart from the water wash flow 295 of the water wash systems 290 that may be available during grid events. Specifically, additional power may be provided such that the overall power plant may remain compliant with applicable grid codes during grid events. The gas turbine engine 310 thus may be operated at base load with limited over-firing with reduced maintenance.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A combined cycle system, comprising:
   a gas turbine engine comprising a compressor, a combustor, and a turbine;
   a steam turbine engine comprising a condenser;
   a compressor water wash system in communication with the compressor and a water wash flow;
   a combustor water injection system in communication with the combustor and an injection flow;
   a heat recovery steam generator comprising an intermediate pressure section, the intermediate pressure section comprising an intermediate pressure economizer and an intermediate pressure evaporator;
   a flow of supplemental water taken from the intermediate pressure section at a first location downstream of the intermediate pressure economizer and upstream of the intermediate pressure evaporator;
   a performance heater downstream of the heat recovery steam generator, wherein the flow of supplemental water is supplied from the first location to the performance heater to heat a flow of fuel to the combustor; and
   a transient power augmentation system downstream of the performance heater, wherein the transient power augmentation system comprises a tap off line to capture the flow of supplemental water at a second location downstream of the performance heater and upstream of the condenser, wherein the flow of supplemental water is supplied to the combustor by way of a combustor line in communication with the tap off line, and wherein the flow of supplemental water is supplied to the compressor water wash system by way of a water wash line in communication with the tap off line.

2. The combined cycle system of claim 1, wherein the combustor water injection system comprises a demineralized water supply in communication with the injection flow.

3. The combined cycle system of claim 1, wherein the compressor water wash system comprises an on-line water wash system and an off-line water wash system in communication with the water wash flow.

4. The combined cycle system of claim 1, wherein the compressor water wash system comprises a grid frequency control water wash line in communication with the water wash flow.

5. The combined cycle system of claim 1, wherein the compressor water wash system comprises a water tank in communication with the water wash flow.

6. The combined cycle system of claim 5, wherein the compressor water wash system comprises a detergent tank and an eductor positioned downstream of the water tank.

7. The combined cycle system of claim 1, wherein the transient power augmentation system comprises an on/off valve.

* * * * *